(12) United States Patent
Martin (10) Patent No.: US 8,370,092 B2
(45) Date of Patent: Feb. 5, 2013

(54) METHOD OF TIMING DEMAND AND TIME-OF-USE FUNCTIONALITY WITH EXTERNAL CLOCK SOURCE

(75) Inventor: Warren T. Martin, Lafayette, IN (US)

(73) Assignee: Landis+Gyr, Inc., Lafayette, IN (US)

( * ) Notice: Subject to any disclaimer, the term of this patent is extended or adjusted under 35 U.S.C. 154(b) by 0 days.

(21) Appl. No.: 13/088,982

(22) Filed: Apr. 18, 2011

(65) Prior Publication Data

US 2011/0196631 A1 Aug. 11, 2011

Related U.S. Application Data

(63) Continuation of application No. 10/984,546, filed on Nov. 8, 2004, now abandoned.

(60) Provisional application No. 60/517,740, filed on Nov. 6, 2003.

(51) Int. Cl.
*G01R 21/00* (2006.01)
(52) U.S. Cl. ............................ 702/61; 702/176; 700/291
(58) Field of Classification Search .................. 700/291, 700/295; 702/57, 60–62, 176, 177, 189; 340/870.02; 324/103 R, 141, 142
See application file for complete search history.

(56) References Cited

U.S. PATENT DOCUMENTS

| | | | | |
|---|---|---|---|---|
| 4,348,730 A | * | 9/1982 | Emerson et al. | ................ 702/62 |
| 4,361,877 A | * | 11/1982 | Dyer et al. | .................... 702/176 |
| 4,654,588 A | * | 3/1987 | Munday | .................... 324/103 R |
| 5,216,357 A | * | 6/1993 | Coppola et al. | ............... 324/142 |
| 5,933,004 A | | 8/1999 | Jackson et al. | |
| 6,121,158 A | | 9/2000 | Benchikha et al. | |
| 6,374,188 B1 | | 4/2002 | Hubbard et al. | |
| 6,429,785 B1 | * | 8/2002 | Griffin et al. | ............ 340/870.02 |
| 6,564,159 B1 | | 5/2003 | Lavoie et al. | |
| 6,859,742 B2 | | 2/2005 | Randall | |
| 2003/0004661 A1 | | 1/2003 | Burns | |
| 2004/0011381 A1 | | 1/2004 | Klebanoff et al. | |

* cited by examiner

Primary Examiner — Manuel L Barbee
(74) Attorney, Agent, or Firm — Maginot, Moore & Beck (57) ABSTRACT

A method of associating chronological time with energy consumption includes a step of storing in a utility meter a plurality of energy consumption values, each energy consumption value corresponding to a time interval of a first type. The method also includes obtaining from a source external to the utility meter chronological time information regarding at least one of the plurality of energy consumption values. The method further includes associating each of the energy consumption values with a time interval of the second type, each time interval of the second type associated with at least one chronological time value.

23 Claims, 5 Drawing Sheets

METHOD OF TIMING DEMAND AND TIME-OF-USE FUNCTIONALITY WITH EXTERNAL CLOCK SOURCE

CROSS-REFERENCE TO RELATED APPLICATIONS

This application is a continuation of U.S. patent application Ser. No. 10/984,546, filed Nov. 8, 2004, which application claims the benefit of U.S. Provisional Patent Application Ser. No. 60/517,740, filed Nov. 6, 2003, the contents of which are incorporated by reference in their entirety.

FIELD OF THE INVENTION

The present invention relates generally to utility meter systems, and in particular, to meter systems that communicate usage information using communication networks.

BACKGROUND

Electricity meters are used to measure electricity consumption for many purposes, including billing for the usage of energy. In many cases, an electricity meter merely keeps track of accumulated energy usage. The accumulated usage over a month is then applied to one or more billing rates (e.g. dollars per kilowatt hour) to arrive at the amount to be billed to the customer for the month.

Other billing methods are employed in other cases. Two common alternative billing methods include so-called Time of Use (TOU) and Demand metering. Time of Use metering involves application of different rates to energy usage at different times of day. To this end, a TOU meter may maintain several accumulators, one for each billing rate. During billing accumulated energy usage is added to the appropriate one of the many accumulators, depending on the time of day. Different billing rates are then applied to the accumulated energy usage values in each of the accumulators. Demand metering involves billing based on time periods in which the demand is at or near a maximum level. Such billing/metering methods are known.

Historically TOU and Demand functions have been performed by the end device (i.e. the meter). Industry standards, and in some cases governmental regulations, require relatively accurate determination of the start and finish of time periods used for TOU and Demand operations. Such accuracy can be achieved by referencing the timing off of the 60 Hz power line signal, which is generally fairly accurate. In such cases, however, power line timing information is lost in a power outage, and there must be some ability to recover chronological time information (time of day) after the power returns.

The problem of recover after a power outage can be addressed by including a clock chip and a battery for power to maintain the time during a power outage. In some cases, the clock chip may be used during normal operation as well. There are disadvantages to reliance on the clock chip for timing information, however, which are outlined below:

1. The accuracy of clock chips drifts over time, causing devices to become out of synch with the real or actual time;
2. Updating the time information in the meter often requires a visit to the physical location with a programming device;
3. Even when the time information is updated in the meter, the programming devices also have clock drift, and as a result, meters across the population on a system are never truly set to the same time base;
4. The cost of a clock chip and a battery is borne by all metering devices in the system.

To address these problems, some meters now implement two-way communication systems that offer the ability to provide accurate timing information to the meters from a single accurate time base. Keeping the metering devices time synced to the system time greatly improves the accuracy of billing demand and TOU data from the metering devices. However, this solution also has disadvantages. In order to ensure accuracy, all devices must get the correct time within seconds to maintain the integrity of the time-of-use, demand or load profiling data, which is not practical in a system with many metering devices.

There is a need, therefore, for a metering system that addresses one or more of the shortcomings identified above in connection with prior art solutions.

SUMMARY

The invention addresses the above-described need, as well as others, by providing an arrangement that enable storage of energy consumption values in association with a first type of time interval within a meter, and then associating the stored energy consumption values with a second type of time interval, the second type of time interval aligned with or at least anchored or referenced to a chronological clock (e.g. time of day clock). Such a device thus stores energy consumption values in the absence of a standardized clock, and then later associating the energy consumption values with the standardized clock, which may be used to obtain data for standard TOU, Demand or other meter billing or data gathering time periods.

A first embodiment of the invention is a method of associating chronological time with energy consumption. The method includes a step of storing in a utility meter a plurality of energy consumption values, each energy consumption value corresponding to a time interval of a first type. The method also includes obtaining from a source external to the utility meter chronological time information regarding at least one of the plurality of energy consumption values. The method further includes associating each of the energy consumption values with a time interval of the second type, each time interval of the second type associated with at least one chronological time value.

The energy consumption values may be associated with the chronological time value-based time intervals either internal to the meter, or at a remote location from the meter. In the former case, the chronological time information is communicated to the meter. In the latter case, the stored energy consumption values are communicated to a remote facility that has access to chronological time information. Other variations may of course be implemented.

The above described features and advantages, as well as others, will become more readily apparent to those of ordinary skill in the art by reference the following detailed description and accompanying drawings.

DETAILED DESCRIPTION

Figure 1:
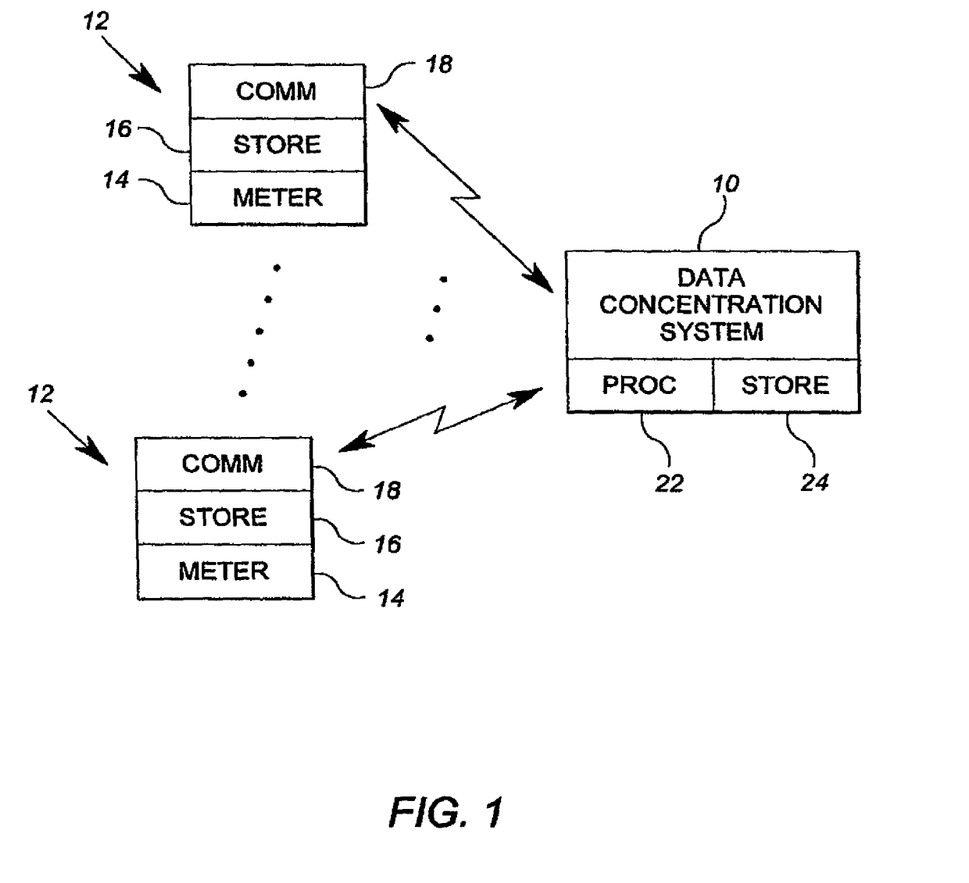
FIG. 1 shows a representative block diagram of an arrangement including a plurality of metering units and a data concentration system that implements embodiments of the invention.

FIG. 1 shows a metering system that includes a data concentration system 10 and a plurality of customer premise metering units 12. The customer premise metering units 12 include a metering device 14, a data store 16 and communication circuit 18. Each metering device 14 is a device that is configured to generate energy consumption information regarding a load. Each data store 16 is a memory device or set of memory devices that store energy consumption information, among other things, as discussed herein. The communication circuit 18 is a device configured to communicate information to and from the data concentration system 10. In an exemplary embodiment, the communication circuit 18 includes a radio.

Figure 2:
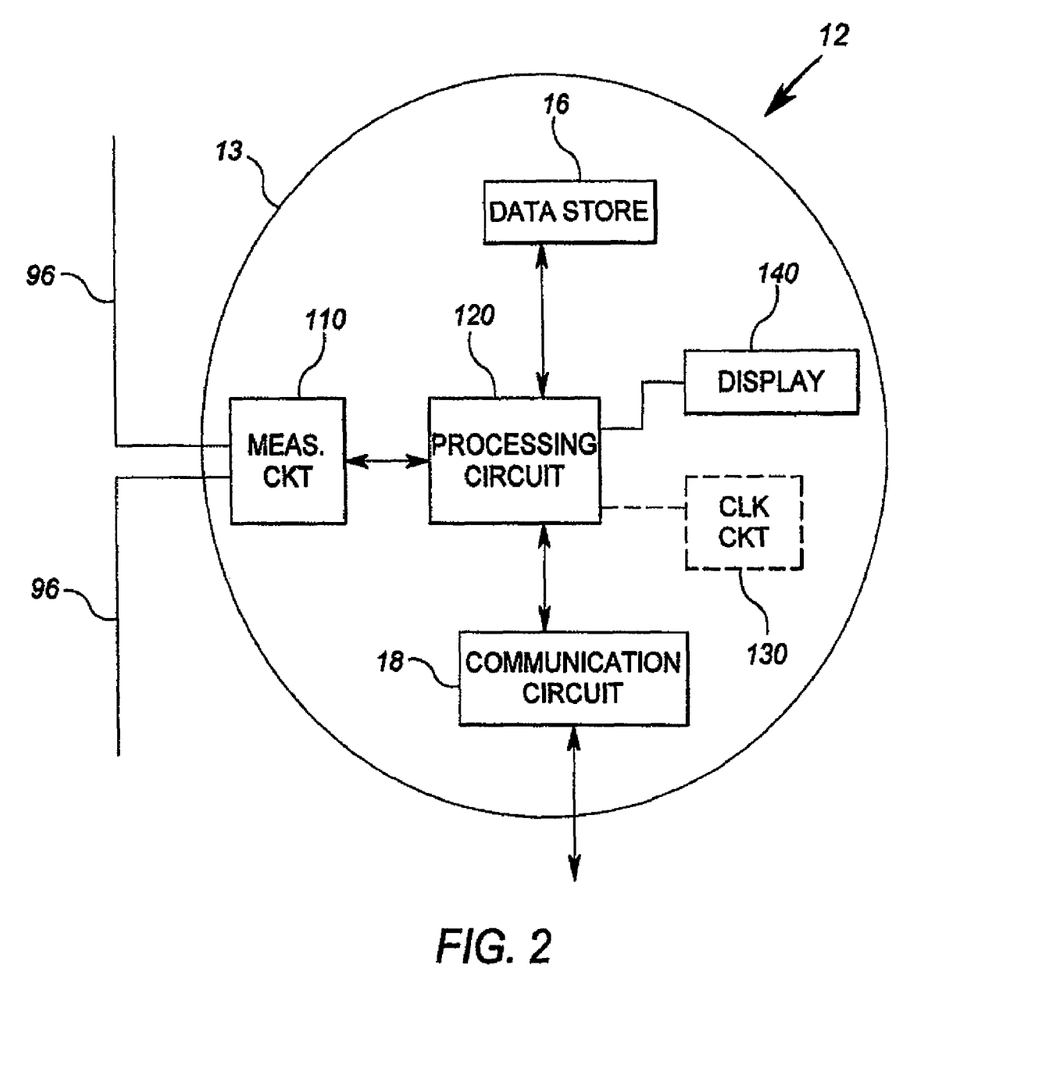
FIG. 2 shows a schematic block diagram of an exemplary metering unit of the arrangement of FIG. 1.

FIG. 2 shows in further detail the metering unit 12 according to at least some embodiments of the present invention. The metering unit 12 is an apparatus for measuring energy consumption that includes a measurement circuit 110, a processing circuit 120, a communication circuit 18, an optional display 140 and a data store 16. All of the above listed elements are preferably supported by a meter housing 13, which may a plurality of known forms. The metering unit 12 shown in FIG. 2 includes an optional chronological clock circuit 130, which is useful in an embodiment described below in connection with FIG. 5.

In the embodiment described herein, the measurement circuit 110 is a circuit operable to generate a first digital signal representative of a line voltage waveform and a second digital signal representative of a line current waveform. To this end, the measurement circuit 110 may suitably comprise current and voltage sensors, not shown, and one or more analog-to-digital converters, not shown. Many circuits capable of generating digital voltage and circuit waveform signals are well known in the art. Suitable examples of input circuits having such capabilities are described in U.S. Pat. Nos. 6,374,188; 6,564,159; 6,121,158 and U.S. Pat. No. 5,933,004, all of which are incorporated herein by reference.

The processing circuit 120 is a device that employs one or more processing devices such as microprocessors, microcontrollers, digital signal processors, discrete digital circuits and/or combinations thereof. The processing circuit 120 is operable to generate energy consumption data based on the first digital signal and the second digital signal. For example, the processing circuit 120 may generate watt-hours, VAR-hrs, power factor, root-mean-square voltage and/or current, or combinations of any of the foregoing. Various processing circuits operable to generate energy consumption data from digital voltage and digital current measurement signals are well known in the art. Suitable examples of such circuits are described in U.S. Pat. Nos. 6,374,188; 6,564,159; 6,121,158 and U.S. Pat. No. 5,933,004.

The processing circuit 120 is further operable to generate energy consumption values corresponding to a time interval of a first type. The energy consumption data preferably represent a quantity of energy (real, VA or VAR) accumulated over the time interval of the first type. The time interval of the first type is preferably a relatively small interval in comparison to a demand, TOU or load profiling time interval. For example, the time interval of the first type should be less than one minute, and preferably less than ten seconds. If the TOU, demand or load profiling time interval is relatively small, for example, 5 to 15 minutes, then the time interval of the first type should be one the order of one second or less. If the TOU, demand or load profiling time interval is more than an hour, then the time interval of the first type may be somewhat larger. Additional detail regarding the relationship between the time interval of the first type and the corresponding standard billing time interval is provided further below.

It will be appreciated that the energy consumption data generated for metering purposes often represents an accumulation of energy for even a smaller time interval. Some measurement circuits such as the circuit 110, either alone, or in combination with the processing circuit 120, generate pulse signals representative of a particular quantum of accumulated consumed energy. Other meters generate accumulated energy usage signal for consecutive sub-second intervals. In such cases, the processing circuit 120 accumulates such energy consumption information, in whatever form, for each successive time interval of the first type.

The processing circuit 120 is further operable to store the plurality of energy consumption values in the data store 16. In other words, for each time interval of the first type, the processing circuit 120 stores the accumulated energy consumption value. Preferably, the energy consumption values are stored in a manner such information regarding the order in which the energy consumption values were generated is retained. For example, the energy consumption values may be stored with a counter that identifies a sequence number for each energy consumption value. In another embodiment, the energy consumption values may be stored in a table in the data store 16, which may be a random access memory, EEPROM, or other memory. In still other embodiments, the data store 16 may be circular buffer, FIFO device, or other memory that stores data in the order in which it is received. In such cases, no additional data need be stored. Other known methods may be used.

The communication circuit 18 is a device operable to communicate data between the metering unit 12 and one or more remote devices. In a system such as that shown in FIG. 1, the communication circuit 18 would be operable to communicate directly or indirectly with the data concentration system 10. To this end, the communication circuit 18 may suitably include a radio, a telephone modem, a power line carrier modem, or other known communication device configured for use with utility meters.

The meter display 140, which is optional, may be a digital display such as a liquid crystal display. It will be appreciated that the exact nature of the display is not particularly important to the implementation of the invention. Nevertheless, there is an advantage of including at least some display capabilities. LCD displays, moreover, have been found to have a particularly advantageous set of qualities for use in electronic meters.

Figure 3:
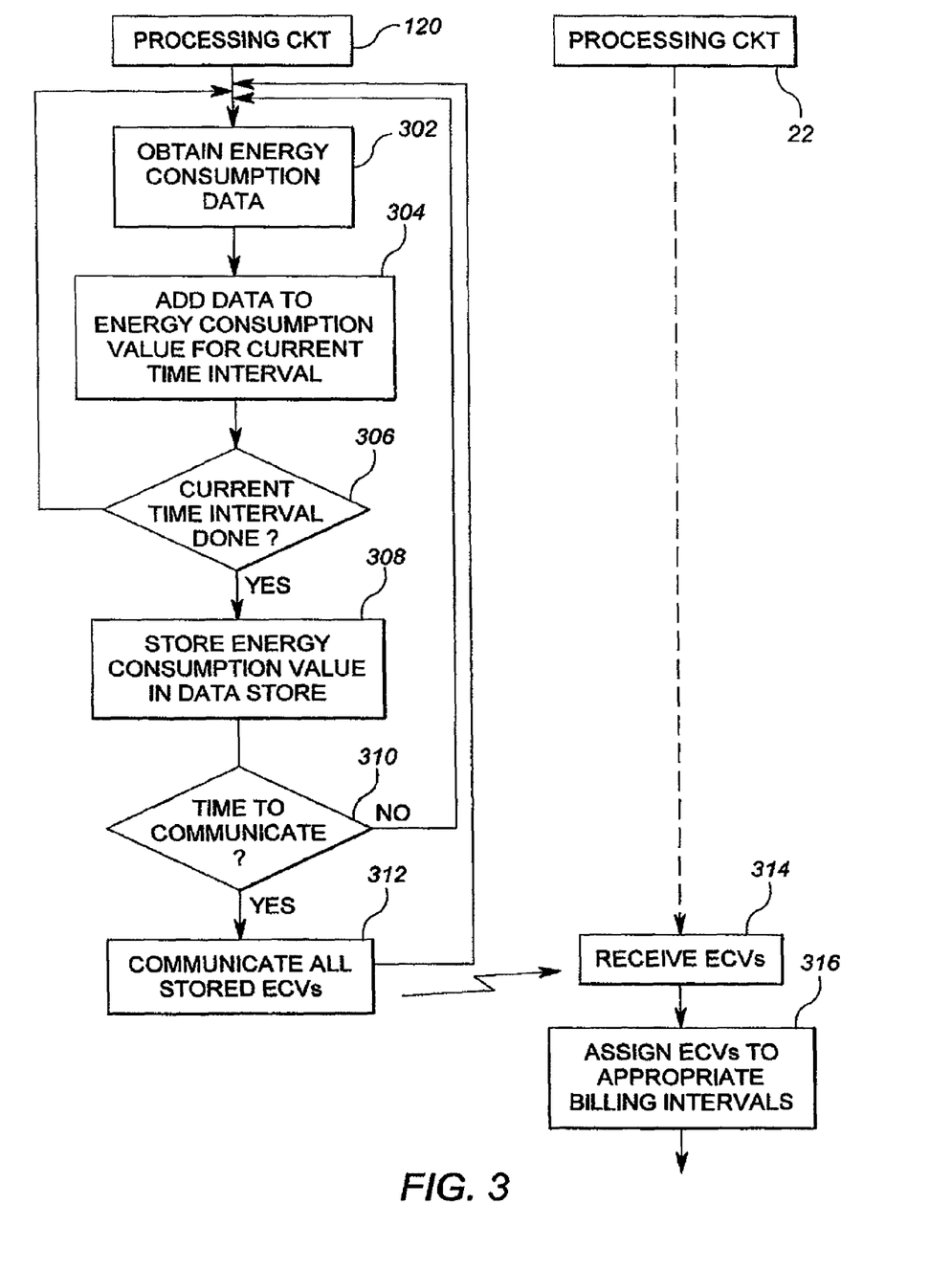
FIG. 3 shows a flow diagram of an exemplary set of operations performed by processing circuits of a metering unit and the data concentration system of the arrangement of FIG. 1.

The chronological clock circuit 130, which is not necessary for the embodiment described below in connection with FIG. 3, is a circuit maintains ongoing chronological clock information (e.g. time of day). Preferably, the chronological clock circuit 130 is operable to receive, from time to time, system standard chronological time information from an external source through the communication circuit 18 or otherwise. Such information synchronizes the clock circuit 130 with other clock circuits of other metering units and/or the data concentration system 10. The chronological clock circuit 130 ordinary updates its calendar/clock value by referencing timing information from the power line signal. Such circuits are known in the art, and may be in part or in whole carried out by the processing circuit 120 hardware.

Referring again to FIG. 1, the data concentration system 10 is a device that is operable to receive energy consumption information from a plurality of metering units 12 and store the information. The data concentration system 10 provides the stored information to a billing system, not shown, that may or may not be co-located with the data concentrator 10. The data concentration system 10 at a minimum includes a processing circuit 22 (such as one or more microprocessors) and associated circuitry and one or more memory or storage devices 24. The data concentration system 10 may be configured as a data server that provides energy consumption information to other computers or systems via wired or wireless networks. Suitable data concentrator systems are known in the art.

The configuration of FIG. 1 may be used to carry out a variety of methods according to the present invention. Two of such methods are described below in relative detail. Alterations and modifications of those methods are within the scope of the invention. A first method relates to a configuration in which the metering unit 12 does not perform any TOU, demand or load profiling operations locally, but rather transmits the energy consumption values to the data concentration system 10. The data concentration system 10 then associates the energy consumption values to the billing system time periods to obtain TOU, demand and/or load profiling information.

FIG. 3 shows a flow diagram of an exemplary set of operations of the processing circuit 120 of the metering unit 12 and the processing circuit 22 of the data concentration system 10 in accordance with the first method described above. In steps 302-308, the processing circuit 120 generates energy consumption values corresponding to time intervals of the first type, and stores the energy consumption values in the data store 16.

In particular, the processing circuit 120 in step 302 obtains energy consumption data representative of energy being consumed by a load. To this end, brief reference is made to FIG. 2. In particular, the meter 12 is connected to measure power flowing through power lines 96. The measurement circuit 110 generates a digital voltage signal, which preferably is a series of digital samples that represent a scaled version of the voltage waveform(s) on the one or more of the power lines 96. The measurement circuit 110 also generates a digital current signal, which preferably is a series of digital samples that represent a scaled version of the current waveform(s) on the one or more of the power lines 96.

The processing circuit 120 receives the digital voltage and current signals and generates energy consumption data, for example, data representative of kilowatt-hours or the like. The processing circuit 120 optionally provides information representative of at least some of the energy consumption data to the display 140. Thus, in the embodiment of FIG. 2, the processing circuit 120 in part generates the energy consumption data. In other embodiments, a separate processing circuit may be used to generate the energy consumption data.

In step 304, new energy consumption data is added to a running total for a current time interval. The time interval is a time interval of the first type, described further above, which is preferably much smaller than a billing time interval. In step 306, the processing circuit 120 determines whether the current time interval has expired or passed. If so, then in step 308, the processing circuit 120 stores the accumulated running total to the data store 16. The accumulated running total represents the energy consumption value for the time interval.

Once the energy consumption value is stored, the processing circuit 120 starts a new running total for the next time interval energy consumption value and proceeds to step 310, discussed further below. It will be appreciated that the data store 16 preferably stores the energy consumption value so as to retain the order in which it was generated with respect to the other energy consumption values of other time intervals.

If, however, in step 306 it is determined that the current time interval has not expired, then the processing circuit 120 returns to step 302 directly to obtain further data for the current time interval.

It will be appreciated that the timing for the current time interval may be obtained using a timing circuit or algorithm within the processing circuit that is referenced to the power line signal. For example, the processing circuit 120 may be configured to count zero crossings of the power line signal based on the digital voltage measurement signal generated by the measurement circuit 110. One-hundred and twenty zero crossings occur for each second of in a power line signal. Thus, the beginning and end of each successive time interval may be determined by counting the appropriate amount of zero crossings. Because the power line signal is relatively precise, the duration of the timing intervals of the first type will be relatively accurate and consistent. However, the chronological time (e.g. the actual time of day) associated with the timing intervals need not be known, and even if known, need not be accurate, within the metering unit 12.

In step 310, which is reached after an energy consumption value is stored for a timing interval, the processing circuit 120 determines whether it is time to communicate stored energy consumption values to the data concentration system 10. If so, then, in step 312, the processing circuit 120 communicates the energy consumption values stored in the data store 16 to the processing circuit 22 of the data concentration system 10. Typically, the processing circuit 120 communicates a plurality of energy consumption values corresponding to a plurality of timing intervals of the first type. Under normal circumstance, the processing circuit 120 communicates the energy consumption values for all of the timing intervals of the first type that have passed since the previous execution of step 312.

The communication in step 312 is effected by the communication circuit 18 of the meter unit 12, which communicates the data to a compatible communication circuit, not shown, of the data concentration system 10. The processing circuit 120 of the metering unit 12 then returns to step 302 to start obtaining new energy consumption values for subsequent time intervals of the first type.

If, however, in step 310, the processing circuit 120 determines that it is not yet time to communicate values to the data concentration system 10, then the processing circuit 120 proceeds directly from step 310 to step 302.

It will be appreciated that the conditional steps 306 and 310 may suitably be interrupt-driven instead of being performed sequentially as shown in FIG. 3. In other words, instead of step 306, the processing circuit 120 may instead repeat steps 302 and 304 until an interrupt is generated indicating that the current timing interval is completed. Similarly, instead of step 310, the processing circuit 120 may instead repeatedly perform the sequence loop of steps 302, 304, 306 and 308 until an interrupt is generated indicating that it is time to communicate values to the data concentrator 10. In such a case, the interrupt may be generated by a timer within the processing circuit 120 or as a result of a polling signal provided by the data concentrator 10.

In any event, referring now to the data concentrator 10, the processing circuit 22 of the data concentrator 10 receives a set of energy consumption values (ECVs) in step 314. In step 316, the processing circuit 22 preferably obtains (internally or from another source) chronological clock information (such as the time of day, or some other system-wide time value). The processing circuit 22 uses the chronological clock information to associate the ECVs with billing time periods. To this end, it will be appreciated that the approximate chronological time for each time period of the received ECVs may be determined by estimating the chronological time of the most recent ECV and knowing the duration of the time periods of the first type. For example, if the time intervals of the first type are each ten seconds, and if thirty ECVs are received when the locally obtained chronological clock information is 10:05:00, then the processing circuit 22 can determine that the last of the thirty ECVs covers from 10:04:50 to 10:05:00, and that the first of the thirty ECVs covers 10:00:00 to 10:00:10. Because the thirty ECVs are stored and preferably communicated such that the order of their generation may be reproduced, the processing circuit 22 can associate each of the ECVs with a particular ten second period between 10:00:00 and 10:05:00. The processing circuit 22 may then associate the ECVs into a particular billing time interval, which will likely be in excess of five minutes.

When the processing circuit associates the ECVs into a particular billing time interval, the energy consumption values for the interval may be accumulated to identify energy consumption totals for the billing (load profiling) time interval. Alternatively, in the case of a TOU meter, the ECVs may be multiplied by a particular use rate based on the associated billing time interval, and then added to a billing total for the metering unit 12.

Thus, in this embodiment, the processing circuit 22 maintains the TOU, demand, and/or load profiling data for the metering unit 12, and preferably for a plurality of other metering units. In contrast to a normal TOU, demand or load profiling meter, the metering unit 12 in this embodiment does not perform measurements and then directly associating energy consumption measurements with a particular billing (or load profiling) time interval. Instead, the metering unit 12 performs measurements to obtain the ECVs for more refined time intervals, but which are not necessarily tied to an accurate chronological clock. The metering provides these ECVs to the data concentrator 10, which uses accurate clock information to backfill the ECVs into the proper billing or load profiling interval or period for that meter.

Figure 4:
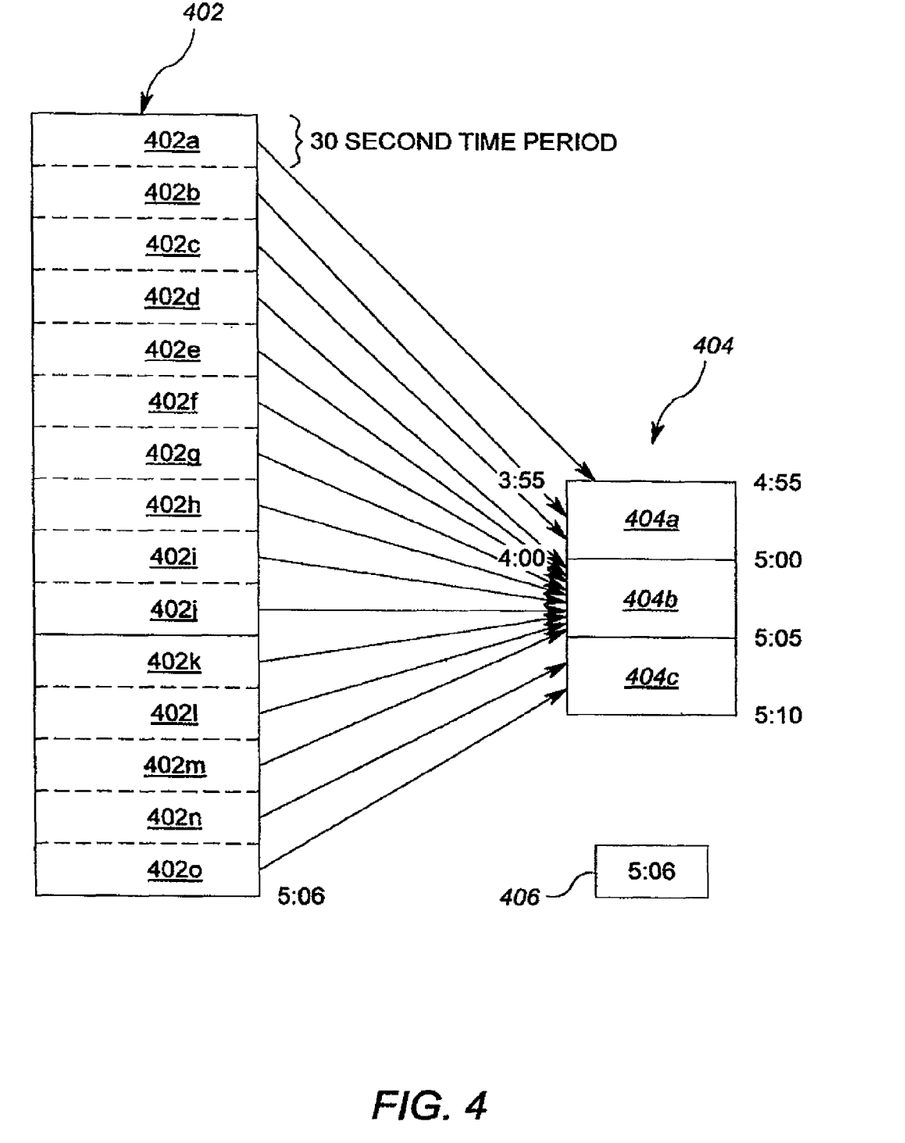
FIG. 4 shows a representative diagram data and timing elements that illustrate an exemplary execution of operations of FIG. 3.

FIG. 4 is a representative drawing that illustrates an exemplary performance of steps 314 and 316 by the processing circuit 22. FIG. 4 shows a plurality of ECVs 402 received from the metering unit 12, and a plurality of load profiling time intervals 404 into which the ECVs 402 are mapped. The processing circuit 22 receives the ECVs 402 and obtains the accurate chronological time information 406, which shows a time of 5:06. Fifteen ECVs $402a \ldots 402o$ are received, and the processing circuit 22 has prior knowledge that the ECVs correspond to timing intervals of thirty seconds. The load profiling time intervals $404a$, $404b$ and $404c$ are assumed to be five minutes each.

The processing circuit 22 determines that the last ECV $402o$ corresponds to a time of between 5:05:30 and 5:06:00, which maps to the load profiling interval $404c$. The processing circuit 22 further determines that the prior ECV $402n$ corresponds to a time of between 5:05:00 and 5:05:30, which also maps to the load profiling interval $404c$. The processing circuit 22 further determines that the next prior ECV $402m$ corresponds to a time of between 5:04:30 and 5:05:00, which maps to the load profiling interval $404b$. In a similar manner, the processing circuit 22 determines that the ECVs $402d$-$402l$ all correspond to times of between 5:00:00 and 5:04:30, and thus map the load profiling interval $404b$, and that the ECVs $402a$-$402c$ also correspond to times of between 4:58:30 and 5:00:00, and thus map the load profiling interval $404a$.

Because the example is a load profiling meter, the processing circuit 22 maintains an accumulated energy consumption sum for each load profiling interval $404x$. Thus, in the case of ECVs $402a$-$402c$, the processing circuit 22 will add the ECVs to an existing value for the load profiling interval $404a$, add the ECVs $402d$-$402m$ to generate a value for the load profiling interval $404b$, and add the ECVs $402n$ and ECVo to generate a value for the load profiling interval $404c$. Additional ECVs for subsequent time intervals will eventually be added to the load profiling interval $404c$ when they are received from the metering unit 12.

Referring again generally to FIG. 3, it will be noted that the processing circuit 22 may provide some billing or load profiling information back to the metering unit 12, if desired, through additional communications. In most cases, the processing circuit 22 instead makes the energy consumption information available to billing processes and/or systems, or to other systems, not shown.

The above described embodiment reduces the need for a highly accurate calendar clock within the metering unit 12. Thus, the metering unit 12 may maintain a less accurate chronological clock, if any. There is no need for a highly accurate chronological clock because all of the calendar or time of day sensitive energy consumption information is determined and stored at the data concentrator 10. Nevertheless, the duration of the ECV timing intervals at the metering unit 12 can be highly accurate relatively inexpensively by referencing the timing intervals directly or indirectly to the 60 Hz AC power line signal.

It will be appreciated that the example of FIG. 4 is given by way of illustration only, and would not typically be implemented precisely as shown. In particular, in order to ensure that the billing (or load profiling) interval totals are accurate in the data concentrator 10, the timing intervals of the first type must have relatively high granularity with respect to the billing or load profiling intervals. Thus, for example, if the defined demand interval for a metering unit 12 is five minutes, then using one minute ECV intervals can provide significant error, because as much as half or more of every fifth ECV would be associated with the wrong demand interval. However, if the metering unit 12 has defined TOU periods that are no less than 3 hours, then a one minute or thirty second ECV interval may subject the calculation to a tolerable amount of error.

In general, it may be preferable to limit the ECV intervals to one second, as they do not necessarily require a lot of memory. In particular, if updates to the data concentrator 10 are only made every hour, then metering unit 12 would only need to store up to approximately 3600 ECVs between communications to the concentrator 10. If the updates to the data concentrator 10 are only made once per day, then the metering unit 12 would still only have to store approximately 86000 ECVs. Such storage in the data store 16 would not be exceedingly expensive.

It will be appreciated, however, that those of ordinary skill in the art may readily determine their own combination of ECV intervals and the time between communications to the data concentrator based on billing time intervals, metering error, accuracy requirements and other factors.

In another embodiment of the invention, the metering unit 12 is configured to maintain a local chronological clock (130) and generate TOU, demand and/or load profiling information locally within the metering unit 12. However, after a power interruption, the metering unit 12 performs operations similar to those of FIG. 3 to enable the metering unit 12 to obtain accurate TOU, demand and/or load profiling information immediately after power is restored.

Figure 5:
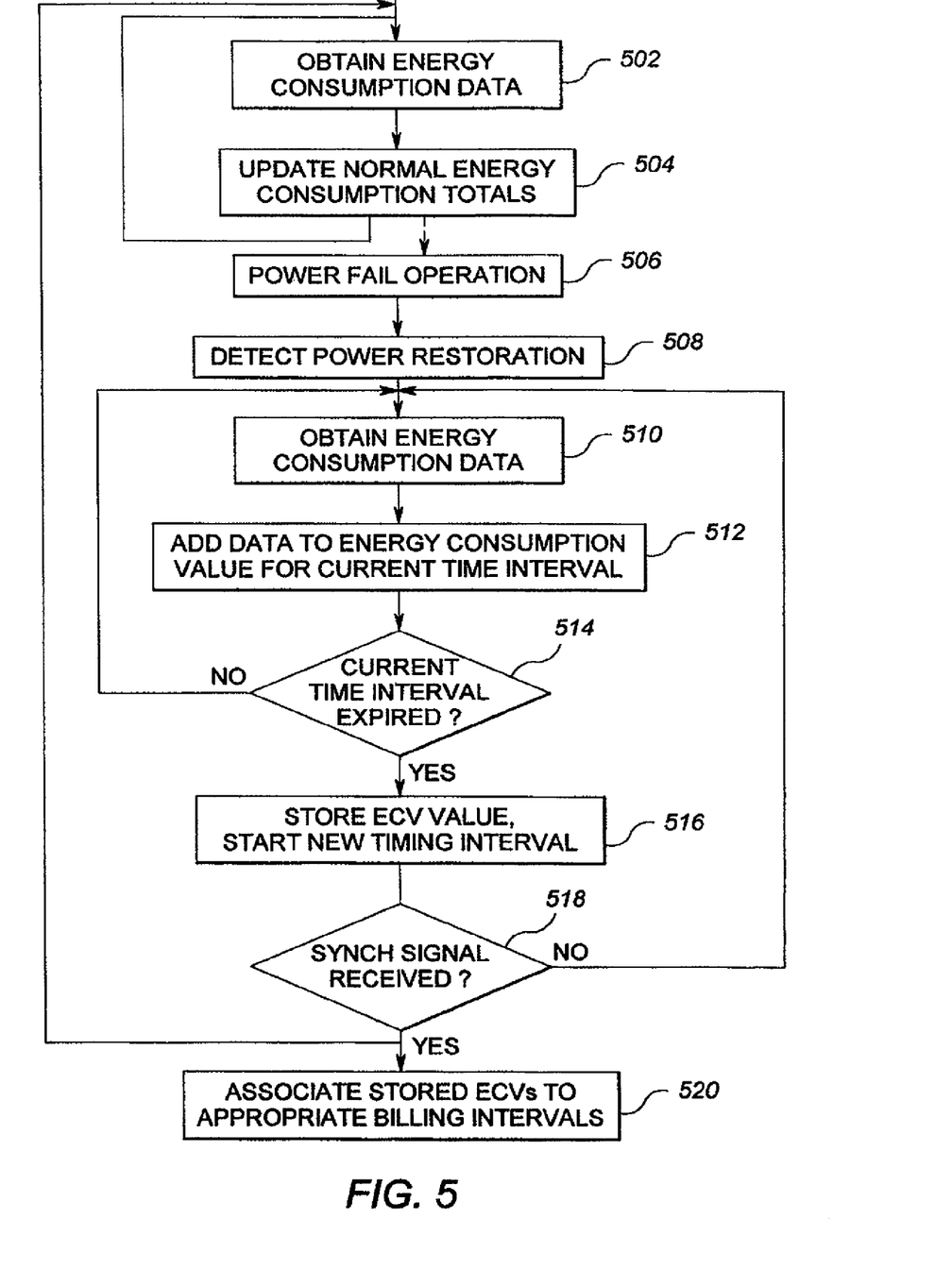
FIG. 5 shows a flow diagram of another exemplary set of operations performed by processing circuit of a metering unit of the arrangement of FIG. 1.

FIG. 5 illustrates an exemplary set of steps performed by the processing circuit 120 of the metering unit 12 in this other embodiment of the invention. In such an embodiment, the processing circuit 120 includes the chronological clock circuit 130. The clock circuit 130 from time to time receives a standard time reference from a remote source, such as the data concentrator 10, another meter, or the like. Such meter processing circuits and clock calendar circuits are known.

Referring now to FIG. 5, in step 502, the processing circuit 120 obtains energy consumption data. Step 502 may suitably be the same as step 302 of FIG. 3. In step 504, the processing circuit 120 updates running energy consumption totals. Such totals typically include overall energy consumption, plus one of a TOU total (rate*energy consumption, where the rate is dependent on the time of day, week, month or season), a demand period total, or a load profiling period total. Such operations are well known in the art. The timing information for the various TOU, demand and load profiling operations is provided by the clock calendar circuit or operations of the processing circuit 120. The processing circuit 120 repeats steps 502 and 504 in the absence of a power interruption.

Assume that an interruption in power occurs. In step 506, the processing circuit 120 in this embodiment goes into a low power mode in which it maintains a counter that counts clock cycles of the interruption. The low power mode may be powered by a battery or a supercapacitor or ultracapacitor. Processors having the ability to operate in such a lower power mode are known in the metering art. Alternatively, the processing circuit 120 may shut down altogether, as would occur in the event of an extended power outage anyway.

Eventually, the utility power is restored. In step 508, the processing circuit 120 detects the restoration of power. After step 508, the processing circuit 120 in step 510 begins obtaining energy consumption data in a manner similar to step 502. The processing circuit 120 also starts a timing interval of the first type similar to that described above in connection with FIG. 3.

In step 512, new energy consumption data is added to a running total for a current time interval of the first type. As discussed above, the time interval of the first type is preferably much smaller than the TOU, demand or load profiling time interval of the metering unit 12. In step 514, the processing circuit 120 determines whether the current time interval has expired or passed. If so, then in step 516, the processing circuit 120 stores the accumulated interval running total to the data store 16 similar to step 308 of FIG. 3. In any event, once the energy consumption value is stored, the processing circuit 120 starts a new running total for the next time interval energy consumption value and proceeds to step 518, discussed further below.

If, however, in step 514 it is determined that the current time interval has not expired, then the processing circuit 120 returns to step 510 directly to obtain further data for the current time interval.

The start and stop times for each time interval may be obtained using a timing circuit or algorithm within the processing circuit that is referenced to the AC power line signal. It is advantageous to use the power lines as the reference in most embodiments in order to reduce the accuracy requirements of the clock circuit 130 within the metering unit 12.

In step 518, the processing circuit 120 determines whether it has received standard or system chronological clock synchronization information from an external source. In particular, after restoration, data concentrator 10 or another external system will eventually provide current standard clock information to the metering unit 12 through communication circuit 18 to allow the metering unit 12 to synchronize to a standard time reference. If such standard clock information has not been received, then processing circuit 120 returns to step 510 to accumulate energy consumption data for a new timing interval.

If synchronizing clock information has been received, however, then the processing circuit 120 returns to step 502 to begin normal processes, but also performs step 520 in parallel (i.e. interleaved or otherwise). In step 520, the processing circuit 120 uses the chronological clock information to associate the ECVs generated and stored in steps 512 and 514 with appropriate billing time periods. Step 520 is thus similar to step 316 of FIG. 3, except that it is performed by the processing circuit 120 of the metering unit 12 in FIG. 5. As with step 316 of FIG. 3, the approximate chronological time for each time period of the received ECVs may be determined by estimating the chronological time of the most recent ECV and knowing the duration of the time periods of the first type.

Thus, in this embodiment, the processing circuit 120 of the metering unit 12 maintains its own TOU, demand, and/or load profiling data. However, the processing circuit 120 uses a method similar to that illustrated in FIG. 3 to temporarily store time interval energy consumption data after a power interruption until the clock of the metering unit 12 can be resynchronized to a time standard. Once the standard clock information is made available to the metering unit 12, backfills the ECVs into the proper billing or load profiling intervals or periods.

The embodiment of FIG. 5 thus allows for the use of a chronological clock circuit within a meter that does not require a highly accurate crystal driver. Using the power line signal, the chronological clock circuit 130 will keep relatively accurate time until a power interruption. After power is restored, the chronological clock circuit 130 within the metering unit 12 may have an inaccurate chronological clock reference (i.e. wrong time of day) or may have no chronological clock reference, similar to a VCR or electronic clock that flashes 12:00 am. However, because energy consumption values are stored in accurate increments of time (based on the power line signal), the metering unit 12 may operate for minutes or hours without a standard synchronizing chronological clock reference. Once the reference is received, the processing circuit 120 merely backfills the ECVs generated without the chronological clock into the proper billing intervals once the clock circuit is resynchronized.

The above described embodiments are merely exemplary. Those of ordinary skill in the art may readily devise their own implementations that incorporate the principles of the present invention and fall within the spirit and scope thereof.

I claim:

1. A method of associating chronological time with energy consumption, comprising:
   a) storing a plurality of energy consumption values including a most recent energy consumption value and a plurality of successively earlier energy consumption values at a storage location, each energy consumption value corresponding to a time interval of a first type;
   b) sending the plurality of energy consumption values to a source external to the storage location;
   c) obtaining from the source external to the storage location a first chronological time information regarding one of the plurality of energy consumption values and
   d) associating each of the plurality of energy consumption values with a time interval of a second type, each time interval of the second type associated with at least one chronological time value obtained from the source external to the storage location, wherein associating each of the plurality of energy consumption values with a time interval of the second type includes first (i) determining a time interval of the second type to be associated with the most recent energy consumption value by associating the most recent energy consumption value with the first chronological time information, and then (ii) determining the time interval of the second type to be associated with the successively earlier energy consumption values by associating the plurality of successively earlier energy consumption values with the first chronological time information less some multiple of the time interval of the first type.

2. The method of claim 1, further comprising:
accumulating, for each time interval of the second type, energy consumption values associated with each chronological time value.

3. The method of claim 1, wherein step a) further comprises:
storing the plurality of energy consumption values in a manner such that a time order in which the energy consumption values were created may be reproduced.

4. The method of claim 1, wherein step d) further comprises associating each of the energy consumption values with the time interval of the second type at a device external from the meter.

5. The method of claim 1, wherein step d) further comprises associating each of the energy consumption values with the time interval of the second type within the meter.

6. The method of claim 1, further comprising:
performing step a) only after an interruption of power to the meter.

7. The method of claim 1, wherein each time interval of the first type has a first duration and each time interval of the second type has a second duration, the first duration less than the second duration.

8. The method of claim 7, wherein the first duration is less than one minute.

9. The method of claim 8, wherein the second duration is more than five minutes.

10. An arrangement for associating chronological time with energy consumption, comprising:
a measurement circuit operable to generate energy consumption data, and further operable to provide the energy consumption data to a first processing circuit;
the first processing circuit operable to:
obtain the energy consumption data, and generate energy consumption values based thereon, each energy consumption value corresponding to a time interval of a first type;
store in a utility meter the plurality of energy consumption values; and
transmit the plurality of energy consumption values to a second processing circuit, wherein the plurality of energy consumption values sent to the second processing circuit includes a most recent energy consumption value and a plurality of successively earlier energy consumption values;
the second processing circuit operable to:
obtain from a source external to the utility meter first chronological time information regarding the most recent energy consumption value, and associate the most recent energy consumption value with the first chronological time information;
associate each of the energy consumption values with a time interval of a second type by first associating the most recent energy consumption value with a time interval of the second type that includes the first chronological time information, and then associating the plurality of successively earlier energy consumption values with a time interval of the second type that includes a time earlier than the first chronological time information by some multiple of the time interval of the first type.

11. The arrangement of claim 10, wherein the energy consumption data is representative of energy consumption for a time interval of a third type.

12. The arrangement of claim 10, wherein the second processing circuit is further operable to accumulate, for each time interval of the second type, energy consumption values associated with each chronological time value.

13. The arrangement of claim 10, wherein the second processing circuit is further operable to receive and store the plurality of energy consumption values in a manner such that a time order in which the energy consumption values were created may be reproduced.

14. The arrangement of claim 10, wherein each time interval of the first type has a first duration and each time interval of the second type has a second duration, the first duration less than the second duration.

15. The arrangement of claim 14, wherein the first duration is less than one minute.

16. The arrangement of claim 15, wherein the second duration is more than five minutes.

17. An arrangement for associating chronological time with energy consumption, comprising:
a first processing circuit operable to generate a plurality of energy consumption values including a single energy consumption value and other energy consumption values generated previous to the single energy consumption value, each of the plurality of energy consumption value corresponding to a time interval of a first type, the first processing circuit further operable to store the plurality of energy consumption values within a utility meter, the first processing circuit further operable to cause the stored plurality of energy consumption values to be communicated wirelessly to a location external to the utility meter;
a second processing circuit external to the utility meter, the second processing circuit operable to receive the stored plurality of energy consumption values, the second processing circuit operable to (i) associate the single energy consumption value with chronological time information obtained from a different source than the source from which the plurality of energy consumption values were received, (ii) determine chronological time information for the other energy consumption values after the chronological time information obtained from the different source is associated with the single energy consumption value, the determined chronological time information for the other energy consumption values based at least in part on the chronological time information associated with the single energy consumption value and the time interval of the first type, and (iii) associate each of the received energy consumption values with a time interval of the second type, each time interval of the second type associated with at least one chronological time value obtained from the different source.

18. The arrangement of claim 17, wherein the second processing circuit is further operable to accumulate, for each time interval of the second type, energy consumption values associated with each chronological time value.

19. The arrangement of claim 17, wherein the first processing circuit is further operable to communicate the plurality of energy consumption values in a manner such that a time order in which the energy consumption values were created may be reproduced.

20. The arrangement of claim 17, wherein each time interval of the first type has a first duration and each time interval of the second type has a second duration, the first duration less than the second duration.

21. The arrangement of claim 20, wherein the first duration is less than one minute.

22. The arrangement of claim 21, wherein the second duration is more than five minutes.

23. The method of claim 1 wherein the source external to the utility meter includes information concerning the time interval of the first type.

* * * * *